United States Patent
Holtrup et al.

(10) Patent No.: US 6,646,016 B2
(45) Date of Patent: Nov. 11, 2003

(54) AROMATIC ALDEHYDE RESINS AND THEIR USE AS EMULSION BREAKERS

(75) Inventors: Frank Holtrup, Burgkirchen (DE); Elisabeth Wasmund, Burgkirchen (DE); Wolfram Baumgärtner, Altötting (DE); Michael Feustel, Köngernheim (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/144,951

(22) Filed: May 14, 2002

(65) Prior Publication Data

US 2002/0156136 A1 Oct. 24, 2002

Related U.S. Application Data

(62) Division of application No. 09/549,015, filed on Apr. 14, 2000, now Pat. No. 6,465,528.

(30) Foreign Application Priority Data

Apr. 15, 1999 (GB) .............................. 19916946

(51) Int. Cl.⁷ .......................... B01D 17/05; C08G 2/22
(52) U.S. Cl. .................. 516/168; 516/172; 516/173; 516/177; 516/178; 516/179; 528/99; 528/250; 525/450
(58) Field of Search ................ 516/168, 179, 516/173, 178, 172, 177; 528/99, 250; 525/540, 418, 509; 568/609

(56) References Cited

U.S. PATENT DOCUMENTS

| | | | | |
|---|---|---|---|---|
| 2,499,365 A | 3/1950 | De Groote et al. | ......... | 252/338 |
| 2,683,730 A | 7/1954 | Seeger et al. | ................ | 564/331 |
| 2,743,255 A | 4/1956 | DeGroote | .................. | 525/497 |
| 2,950,263 A | 8/1960 | Abbotson et al. | ........... | 521/129 |
| 3,065,206 A | 11/1962 | Chamot | ...................... | 564/367 |
| 3,186,969 A | 6/1965 | Cox et al. | .................... | 525/507 |
| 3,244,731 A * | 4/1966 | Winfield et al. | ............ | 525/113 |
| 3,245,924 A * | 4/1966 | Cox et al. | .................... | 521/167 |
| 3,403,131 A * | 9/1968 | Garnish | ....................... | 528/99 |
| 3,423,344 A | 1/1969 | Odinak et al. | .............. | 564/330 |
| 3,583,486 A | 6/1971 | Stratton | ...................... | 166/274 |
| 3,594,393 A * | 7/1971 | Buriks et al. | ................ | 516/179 |
| 3,830,850 A | 8/1974 | Stratton | ................. | 260/613 B |
| 4,032,514 A | 6/1977 | Buriks et al. | ................ | 525/507 |
| 4,060,501 A | 11/1977 | Naylor et al. | ............... | 252/548 |
| 4,117,031 A | 9/1978 | Macenka et al. | ........... | 525/507 |
| 4,431,565 A | 2/1984 | Billenstein et al. | ......... | 516/183 |

FOREIGN PATENT DOCUMENTS

| | | |
|---|---|---|
| DE | 24 45 873 | 4/1976 |
| DE | 1 060 140 | 8/1977 |
| EP | 0 078 975 | 8/1983 |

* cited by examiner

*Primary Examiner*—Daniel S. Metzmaier
(74) *Attorney, Agent, or Firm*—Richard P. Silverman; Susan S. Jackson

(57) ABSTRACT

Resins useful in methods of breaking oil-water emulsions. The resins obtained by reacting a compound of formula 1 with an aldehyde and alkoxylating, in any order:

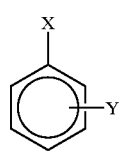

(1)

wherein X is —NHR$^1$; —COOH; or —CONHR$^2$; and is ortho—, meta— or para— to X and is a radical of —O—R$^3$; —C(O)R$^4$; —OC(O)R$^5$; —NR$^6$R$^7$; wherein R$^1$–R$^7$ values are defined herein.

4 Claims, No Drawings

AROMATIC ALDEHYDE RESINS AND THEIR USE AS EMULSION BREAKERS

This divisional of application Ser. No. 09/549,015, filed Apr. 14, 2000, now U.S. Pat. No. 6,465,525.

BACKGROUND OF THE INVENTION

The present invention relates to resins preparable from aromatic compounds by condensation with aldehydes, and to their use for breaking water-oil emulsions, in particular in the production of crude oil.

During its recovery, crude oil is produced as an emulsion with water. Before the crude oil is further processed, these crude oil emulsions must be broken into the oil and water constituents. For this purpose, use is generally made of crude oil breakers. Crude oil breakers are surface-active compounds which are able to effect the required separation of the emulsion constituents within a short time.

Crude oil breakers include alkylphenol aldehyde resins, which are disclosed, for example, in U.S. Pat. No. 4,032,514. These resins are obtainable from the condensation of a p-alkylphenol with an aldehyde, in most cases formaldehyde. The resins are often used in alkoxylated form, as is disclosed, for example, in DE-A-24 45 873. For this, the free phenolic OH groups are reacted with an alkylene oxide.

SUMMARY OF THE INVENTION

However, alkylphenol aldehyde resins have recently become the subject of criticism because of their virtually unavoidable content of free alkylphenols and alkylphenol alkoxylates. According to the current state of knowledge, it cannot be ruled out that alkylphenols and alkylphenol alkoxylates have estrogenic action, which would be a potential threat to the animal kingdom.

The object was therefore to find new crude oil breakers which are at least comparable in activity with the alkylphenol aldehyde resins, but which do not comprise alkylphenols or alkylphenol alkoxylates, and are therefore not suspected of having estrogenic action.

Surprisingly, we have found that certain novel alkylphenol-free aromatic aldehyde resins which have a functional group capable of alkoxylation, but no alkyl radical on the aromatic ring, exhibit excellent action as crude oil breakers and are not suspected of having a hormone-like action.

DESCRIPTION OF THE PREFERRED EMBODIMENTS

The invention thus provides resins obtainable from compounds of the formula 1

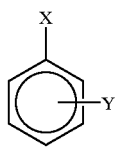
(1)

in which

X is —OH, —NHR$^1$, —COOH or —CONHR$^2$, in which
R$^1$ is H, C$_1$–C$_{30}$-alkyl C$_2$–C$_{30}$-alkenyl, C$_6$–C$_{18}$-aryl, C$_7$–C$_{30}$-alkylaryl or —COR$^2$
R$^2$ is H, C$_1$–C$_{30}$-alkyl, C$_2$–C$_{30}$-alkenyl, C$_6$–C$_{18}$-aryl, C$_7$–C$_{30}$-alkylaryl, Y is in the ortho, meta or para position relative to X, and is a radical of the formulae 2 to 5

(2)

(3)

(4)

(5)

in which

R$^3$ is H, C$_1$–C$_{30}$-alkyl, C$_2$–C$_{30}$-alkenyl, C$_6$–C$_{18}$-aryl, C$_7$–C$_{30}$-alkylaryl R$^4$ is —OR$^3$, —NR$^6$R$^7$ or —R$^5$ R$^5$ is C$_1$–C$_{30}$-alkyl, C$_2$–C$_{30}$-alkenyl, C$_6$–C$_{18}$-aryl, C$_7$–C$_{30}$-alkylaryl R$^6$ has the same meaning as given for R$^3$, or is —COR$^3$, but is independent of R$^3$, R$^7$ has the same meaning as given for R$^3$, or is —COR$^3$, but is independent of R$^3$, where, for the case X, Y=COOH in the ortho position, the corresponding acid anhydride is also included, by the steps, which can be carried out in any order, of A) reaction with an aldehyde of the formula 6

(6), where R$^8$ is H, C$_1$–C$_{30}$-alkyl, C$_2$–C$_{30}$-alkenyl, C$_6$–C$_{18}$-aryl, C$_7$–C$_{30}$-alkylaryl, and B) alkoxylation with a C$_2$–C$_4$-alkylene oxide in molar excess, such that the resulting alkoxylate has a degree of alkoxylation of from 1 to 100 alkylene oxide units per —OH or —NH group, and the resin has a molecular mass of from 250 to 100,000 units, with the proviso that X and Y are not OH at the same time.

The compounds of the formula (1) are essentially chemically homogeneous compounds which are not used in mixtures with one another. The term "essentially" means here that, for the preparation of the resins according to the invention, compounds of the formula (1) are used in commercially available purity. Proportions of other compounds covered by formula (1) can therefore be present in the resins, it being necessary, in particular, to draw attention to proportions of the two other aromatic substitution isomers in each case which have not been completely removed. The same is true for the aldehyde used for the condensation. This too is essentially to be used as a homogeneous substance, where aldehydes of commercially available purity are used.

The compounds of the formula (1) are preferably compounds from the following groups:

A) derivatives of o-, m- and p-dihydroxybenzene of the formulae

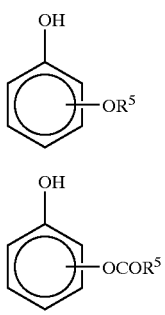 (7)

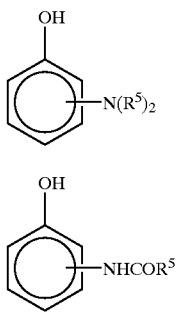 (8)

B) o-, m- and p-aminophenols, and their N-alkylated and N-acylated derivatives of the formulae (9)

(10)

(11)

(12)

C) o- and p-hydroxybenzoic acids and their amides or esters of the formulae (13)

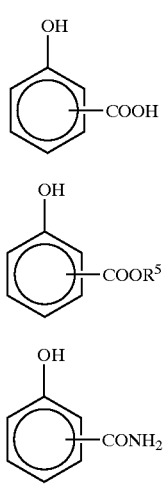 (14)

(15)

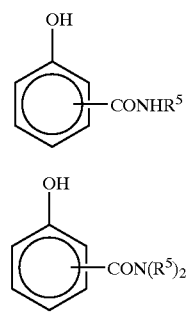 (16)

(17)

D) terephthalic and phthalic acid and their monoesters

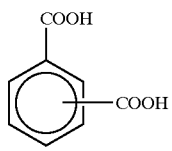 (18)

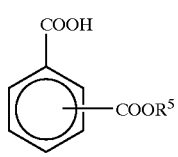 (19)

E) ethers of amides of o-, p-hydroxybenzoic acid of the formulae (20)

(21)

where $R^5$ and $R^{5'}$ both have the meaning of $R^5$, but do not have to be identical.

If one of the radicals $R^1$, $R^2$, $R^3$, $R^5$, $R^6$ or $R^7$ is an alkenyl or alkyl radical, then its chain length is preferably from 2 to 24, particularly preferably from 4 to 22, especially from 4 to 18, carbon atoms. Alkyl and alkenyl radicals can either be linear or branched.

If one of the radicals $R^1$, $R^2$, $R^3$, $R^5$, $R^6$ or $R^7$ is an alkylaryl radical, then alkylaryl is preferably a radical bonded via the aromatic ring, whose aromatic ring preferably includes 6 carbon atoms, and which carries, in the o-, m- or p-position relative to the abovementioned bond, an alkyl radical having a chain length of preferably from 1 to 18, particularly preferably from 4 to 16, in particular from 6 to 12, carbon atoms.

In a further preferred embodiment of the invention, the compound of the formula 1 is phthalic anhydride.

If step A is carried out first and then step B, the compounds of the formula 1 are then reacted (condensed) with aldehydes of the formula 6 to give a resin. The aldehydes of the formula 6 are preferably those in which $R^8$ is H or a $C_1$–$C_6$-alkyl radical, in particular H or a $C_1$–C4-alkyl radical. In a particularly preferred embodiment, $R^8$ is hydrogen. The condensation can either be acid-catalyzed or base-catalyzed. The resins resulting from the condensation are in this case then alkoxylated with a $C_2$–$C_4$-alkylene oxide, preferably ethylene oxide or propylene oxide. The alkoxylating agent is used in molar excess. The alkoxylation takes place on the free OH or NH groups of the resulting resin. Alkylene oxide is used in an amount such that the average degree of alkoxylation is between 1 and 100 alkylene oxide units per free OH or NH group. The term "average degree of alkoxylation" here means the average number of alkoxy units which are attached to each free OH or NH group. It is preferably from 1 to 70, in particular from 2 to 50.

Steps A) (condensation) and B) (alkoxylation) are preferably carried out in this order. It is, however, also possible to carry them out in reverse order. In this case, the compounds of the formula 1 are firstly alkoxylated, and then converted into the resin.

The resin obtained after condensation and alkoxylation preferably has a molecular weight of from 500 to 50,000 units, in particular from 1000 to 10,000 units.

Preferred resins which are obtainable by the described process have the following 20 structures:

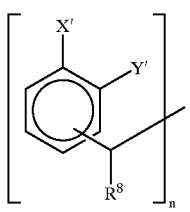
(22)

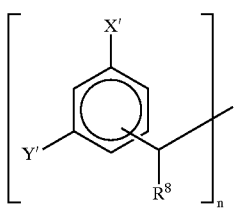
(23)

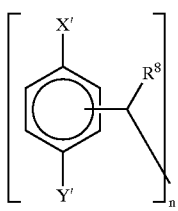
(24)

$X^1$ and $Y^1$ are radicals X and Y optionally alkoxylated with from 1 to 100 alkoxy units. $X^1$ or $Y^1$ can also be identical to X or Y, provided X or Y cannot be alkoxyaated in the individual case. Thus, for example, $X^1$ can be

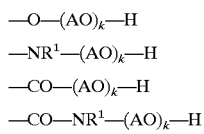

In which AO is the alkylene oxide unit, and k is the degree of alkoxylation.

The bridging of the aromatic rings via the carbon atom carrying the radical $R^8$ can join onto any of the free positions of the aromatic rings. n is the degree of condensation of the resin. n is preferably a number from 2 to 100, in particular from 3 to 50, particularly preferably from 4 to 30, especially from 4 to 10.

The invention further provides for the use of resins for breaking oil-water emulsions, where the resins are obtainable from compounds of the formula 1

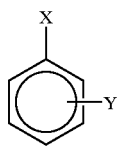
(1)

in which

X is —OH, —NHR$^1$, —COOH or —CONHR$^2$, in which
$R^1$ is H, $C_1$–$C_{30}$-alkyl $C_2$–$C_{30}$-alkenyl, $C_6$–$C_{18}$-aryl, $C_7$–$C_{30}$-alkylaryl or —COR$^2$
$R^2$ is H, $C_1$–$C_{30}$-alkyl, $C_2$–$C_{30}$-alkenyl, $C_6$–$C_{18}$-aryl, $C_7$–$C_{30}$-alkylaryl, Y is in the ortho, meta or para position relative to X, and is a radical of the formulae 2 to 5

(2)

(3)

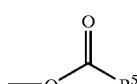
(4)

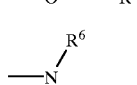
(5)

in which $R^3$ is H, $C_1$–$C_{30}$-alkyl, $C_2$–$C_{30}$-alkenyl, $C_6$–$C_{18}$-aryl, $C_7$–$C_{30}$-alkylaryl $R^4$ is —OR$^3$, —NR$^6$R$^7$ or —R$^5$ $R^5$ is $C_1$–$C_{30}$-alkyl, $C_2$–$C_{30}$-alkenyl, $C_6$–$C_{18}$-aryl, $C_7$–$C_{30}$-alkylaryl $R^6$ has the same meaning as given for $R^3$, or is —COR$^3$, but is independent of $R^3$, $R^7$ has the same meaning as given for $R^3$, or is —COR$^3$, but is independent of $R^3$, where, for the case X, Y=COOH in the ortho position, the corresponding acid anhydride is also included, by the steps, which can be carried out in any order, of A) reaction with an aldehyde of the formula 6

$R^8$—CHO    (6), where $R^8$ is H, $C_1$–$C_{30}$-alkyl, $C_2$–$C_{30}$-alkenyl, $C_6$–$C_{18}$-aryl, $C_7$–$C_{30}$-alkylaryl, and B) alkoxylation with a $C_2$–$C_4$-alkylene oxide in molar excess, such that the resulting alkoxylate has a degree of alkoxylation of from 1 to 100 alkylene oxide units per —OH or —NH group, and the resin has a molecular mass of from 250 to 100,000 units.

For use as crude oil breakers, the resins are added to the water-oil emulsions, which preferably takes place in solution. Preferred solvents are paraffinic or aromatic solvents. The amounts are from 0.0001 to 5% by weight, preferably from 0.0005 to 2% by weight, in particular from 0.0008 to 1% by weight and especially from 0.001 to 0.1% by weight, of resin based on the oil content of the emulsion to be broken.

The compounds according to the invention are generally prepared by acid- or alkalicatalyzed condensation of the compounds of the formula 1 with the aldehydes of the formula 6, where the alkoxylation can precede or follow the condensation. The reaction temperature is generally between 50 and 170° C., preferably from 120 to 165° C. The reaction is normally carried out at atmospheric pressure. Examples of catalyzing acids which may be mentioned are HCl, $H_2SO_4$, sulfonic acids or $H_3PO_4$, and bases which may be mentioned are NaOH, KOH or triethylamine, which are used in amounts of from 0.1 to 50% by weight, based on the weight of the reaction mixture. The condensation generally requires from 30 min to 6 hours. The molar ratio between aldehyde and aromatic compound is generally from 0.2:1 to 4:1, preferably from 0.4:1 to 4:1, particularly preferably from 0.5:1 to 1.8:1, specifically from 0.8:1 to 1.8:1 and in particular from 0.8:1 to 1.2:1.

The alkoxylation is carried out, as is known from the prior art, by reacting the resins with an alkylene oxide under an increased pressure of generally from 1.1 to 20 bar at temperatures of from 50 to 200° C.

EXAMPLES

Example 1

Reaction of hydroquinone with formaldehyde 55.1 g of hydroquinone (M=110) were dissolved in 200 ml of ethanol at room temperature in a 500 ml four-necked flask fitted with contact thermometer, stirrer and dropping funnel, and 0.3 g of sulfuric acid (98% strength) were added. The reaction mixture was heated to 75–80° C., 40.3 g of formaldehyde solution (35% strength in water) were slowly added dropwise and the mixture was stirred for 2 hours at 75–80° C. The mixture was then cooled to room temperature and transferred to a round-bottomed flask, and the solvent was distilled off on a rotary evaporator at 80° C. and full water-pump vacuum. The dried product (yield: 49.9 g) was analyzed using GPC.

Example 2

Reaction of resorcinol with formaldehyde 55.5 g of resorcinol (M=110) were dissolved in 200 ml of ethanol at room temperature in a 500 ml four-necked flask fitted with contact thermometer, stirrer and dropping funnel, and 0.3 g of sulfuric acid (98% strength) were added. The reaction mixture was heated to 75–80° C., 40.4 g of formaldehyde solution (35% strength in water) were slowly added dropwise and the mixture was stirred for 2 hours at 75–80° C. The mixture was then cooled to room temperature and transferred to a round-bottomed flask, and the solvent was distilled off on a rotary evaporator at 80° C. and full water-pump vacuum. The dried product (yield: 48.2 g) was analyzed using GPC.

Example 3

Reaction of pyrocatechol with formaldehyde 54.9 g of pyrocatechol (M=110) were dissolved in 200 ml of ethanol at room temperature in a 500 ml four-necked flask fitted with contact thermometer, stirrer and dropping funnel, and 0.3 g of sulfuric acid (98% strength) were added. The reaction mixture was heated to 75–80° C., 40.1 g of formaldehyde solution (35% strength in water) were slowly added dropwise and the mixture was stirred for 2 hours at 75–80° C. The mixture was then cooled to room temperature and transferred to a round-bottomed flask, and the solvent was distilled off on a rotary evaporator at 80° C. and full water-pump vacuum. The dried product (yield: 52.9 g) was analyzed using GPC.

Example 4

Reaction of paramethoxyphenol with formaldehyde 55.0 g of paramethoxyphenol (M=124) were dissolved in 200 ml of ethanol at room temperature in a 500 ml four-necked flask fitted with contact thermometer, stirrer and dropping funnel, and 0.3 g of sulfuric acid (98% strength) were added. The reaction mixture was heated to 75–80° C., 38.0 g of formaldehyde solution (35% strength in water) were slowly added and the mixture was stirred for 2 hours at this temperature. The mixture was then cooled to room temperature and transferred to a round-bottomed flask, and the solvent was distilled off on a rotary evaporator at 80° C. and full water-pump vacuum. The dried product (yield: 49.9 g) was analyzed using GPC.

Example 5

Reaction of resorcinol octadecyl ether with formaldehyde (acidic catalysis)

A 100 ml four-necked flask fitted with contact thermometer, stirrer, dropping funnel and water separator was flushed with 46.0 g of resorcinol octadecyl ether (M=362), 50 g of an aromatic solvent and 0.2 g of alkylbenzenesulfonic acid. With stirring and nitrogen blanketing, the reaction mixture was heated to 120° C., and at this temperature 10.9 g of aqueous formaldehyde solution (35% strength) were slowly added dropwise. When the addition was complete, the mixture was stirred for one hour at 120° C. and for one hour at 165° C., and the water of reaction which formed was removed azeotropically. The product was dried on a rotary evaporator (yield: 42.5 g) and analyzed using GPC.

Example 6

Reaction of resorcinol octadecyl ether with formaldehyde (alkaline catalysis)

A 100 ml four-necked flask fitted with contact thermometer, stirrer, dropping funnel and water separator was flushed with 45.6 g of resorcinol octadecyl ether (M=362), 50 g of an aromatic solvent and 0.7 g of 40% strength potassium hydroxide solution. With stirring and nitrogen blanketing, the reaction mixture was heated to 120° C., and at this temperature 10.8 g of aqueous formaldehyde solution (35% strength) were slowly added dropwise. When the addition was complete, the mixture was stirred for one hour at 120° C. and for a further hour at 165° C., and the water of reaction which formed was removed azeotropically. The product was dried on a rotary evaporator (yield: 43.5 g) and analyzed using GPC.

Example 7

Reaction of butyl p-hydroxybenzoate with formaldehyde (acidic catalysis)

97.1 g of butyl p-hydroxybenzoate (M=206) and 0.8 g of alkylbenzenesulfonic acid (0.5 mol %) were dissolved in 100 g of an aromatic solvent in a 500 ml stirred flask fitted with contact thermometer, stirrer, dropping funnel and water separator. With stirring and nitrogen blanketing, the reaction mixture was heated to 120° C., and at this temperature 41.0 g of formaldehyde solution (35% strength in water) were slowly added dropwise. When addition was complete, the mixture was stirred for one hour at 120° C. and for one hour at 165° C., and the water of reaction which formed was removed via the separator. The product was dried on a rotary evaporator (yield: 98.5 g) and analyzed using GPC.

Example 8

Reaction of butyl p-hydroxybenzoate with formaldehyde (alkaline catalysis)

97.0 g of butyl p-hydroxybenzoate and 1.5 g of 40% strength potassium hydroxide solution were dissolved in 100 g of an aromatic solvent in a 500 ml stirred flask fitted with contact thermometer, stirrer, dropping funnel and water separator. With stirring and nitrogen blanketing, the reaction mixture was heated to 120° C., and at this temperature 41.0 g of formaldehyde solution (35% strength in water) were slowly added dropwise. When the addition was complete, the mixture was stirred for one hour at 120° C. and for one hour at 165° C., and the water of reaction which formed was removed via the separator. The product was dried on a rotary evaporator (yield: 90.5 g) and analyzed using GPC.

Example 9

Reaction of p-N,N-dibutylaminophenol with formaldehyde (acidic catalysis)

80.0 g of p-N,N-dibutylaminophenol (M=221) and 0.6 g of alkylbenzenesulfonic acid were dissolved in 80 g of aromatic solvent in a 500 ml stirred flask fitted with contact thermometer, stirrer, dropping funnel and water separator. With stirring and nitrogen blanketing, the reaction mixture was heated to 120° C., and at this temperature 31.0 g of formaldehyde solution (35% strength in water) were slowly added dropwise. When the addition was complete, the mixture was stirred for one hour at 120° C. and for one hour at 165° C., and the water of reaction which formed was removed via the separator. The product was dried on a rotary evaporator (yield: 80.5 g) and analyzed using GPC.

Example 10

Reaction of p-N,N-dibutylaminophenol with formaldehyde (alkaline catalysis)

80.0 g of p-N,N-dibutylaminophenol (M=221) and 1.2 g of 40% strength potassium hydroxide solution were dissolved in 80 g of aromatic solvent in a 500 ml stirred flask fitted with contact thermometer, stirrer, dropping funnel and water separator. With stirring and nitrogen blanketing, the reaction mixture was heated to 120° C., and at this temperature 31.0 g of formaldehyde solution (35% strength in water) were slowly added dropwise. When the addition was complete, the mixture was stirred for one hour at 120° C. and for one hour at 165° C., and the water of reaction which formed was removed via the separator. The product was dried on a rotary evaporator (yield: 76.0 g) and analyzed using GPC.

Example 11

Reaction of ethyl salicylate with formaldehyde 60.0 g of ethyl salicylate (M=166) and 0.6 g of alkylbenzenesulfonic acid were dissolved in 60 g of an aromatic solvent in a 500 ml stirred flask fitted with contact thermometer, stirrer, dropping funnel and water separator. With stirring and nitrogen blanketing, the reaction mixture was heated to 120° C., and at this temperature 31.0 g of formaldehyde solution (35% strength in water) were slowly added dropwise. When the addition was complete, the mixture was stirred for one hour at 120° C. and for one hour at 165° C., and the water of reaction which formed was removed via the separator. The product was dried on a rotary evaporator (yield: 61.0 g) and analyzed using GPC.

Alkoxylation of the aromatic aldehyde resins

Ethylene oxide

The resins described above were placed in a 1 l glass autoclave and the pressure in the autoclave was adjusted to a pressure of about 0.2 bar above atmospheric pressure with nitrogen. The system was heated slowly to 140° C. and after this temperature had been achieved the pressure was again adjusted to a pressure of 0.2 bar above atmospheric pressure.

Then, at 140° C., the desired amount of EO was metered in, the pressure not being allowed to exceed 4.5 bar. After the addition of EO was complete, the mixture was left to post-react for a further 30 minutes at 140° C.

Propylene oxide

The resins described above were placed in a 1 l glass autoclave and the pressure in the autoclave was adjusted to a pressure of about 0.2 bar above atmospheric pressure with nitrogen. The system was heated slowly to 130° C. and after this temperature had been achieved the pressure was again adjusted to a pressure of 0.2 bar above atmospheric pressure. Then, at 130° C., the desired amount of PO was metered in, the pressure not being allowed to exceed 4.0 bar. After the addition of PO was complete, the mixture was left to post-react for a further 30 minutes at 25 130° C.

Determination of the breaking effectiveness of crude oil emulsion breakers

To determine the effectiveness of an emulsion breaker, the water separation from a crude oil emulsion per time, and the dewatering and desalting of the oil were determined. For this, demulsifying glasses (tapered, graduated glass flasks with screw lids) were charged in each case with 100 ml of the crude oil emulsion, a defined amount of the emulsion breaker was in each case metered in just below the surface of the oil emulsion using a micropipette, and the breaker was mixed into the emulsion by vigorous shaking. The demulsifying glasses were then placed in a conditioning bath (30° C. and 50° C.) and water separation was monitored. During emulsion breaking and after it had finished, samples were taken from the oil from the upper section of the demulsifying glass (so-called top oil), and the water content was determined in accordance with the Karl Fischer method and the salt content was determined conductometrically. In this way, it was possible to assess the novel breakers according to water separation, and dewatering and desalting of the oil.

Breaking action of the breakers described

Source of the crude oil emulsion: Holzkirchen sonde 3, Germany

Water content of the emulsion: 46%

Salt content of the emulsion: 5%

Demulsification temperature: 50° C.

Amount added: 100 ppm

| Water separation [ml] per time [min] | 5 | 10 | 20 | 30 | 45 | 60 | 90 | 120 | 180 | Water in the top oil [%] | Salt in the top oil [ppm] |
|---|---|---|---|---|---|---|---|---|---|---|---|
| Example 1 | 1 | 6 | 28 | 35 | 39 | 41 | 43 | 45 | 46 | 0.50 | 110 |
| Example 2 | 1 | 5 | 32 | 37 | 40 | 41 | 43 | 46 | 46 | 0.33 | 88 |
| Example 3 | 1 | 4 | 26 | 30 | 36 | 40 | 42 | 44 | 46 | 0.54 | 132 |
| Example 4 | 1 | 3 | 22 | 25 | 28 | 31 | 36 | 40 | 46 | 0.38 | 107 |
| Example 5 | 2 | 5 | 21 | 42 | 45 | 46 | 46 | 46 | 46 | 0.05 | 66 |
| Example 6 | 2 | 6 | 20 | 40 | 44 | 45 | 46 | 46 | 46 | 0.08 | 78 |
| Example 7 | 1 | 4 | 15 | 25 | 34 | 39 | 42 | 45 | 46 | 0.44 | 112 |
| Example 8 | 1 | 3 | 14 | 24 | 35 | 40 | 42 | 46 | 46 | 0.47 | 125 |
| Example 9 | 2 | 4 | 19 | 38 | 42 | 44 | 46 | 46 | 46 | 0.36 | 104 |
| Example 10 | 2 | 4 | 17 | 35 | 40 | 42 | 44 | 46 | 46 | 0.40 | 110 |
| Example 11 | 0 | 2 | 8 | 16 | 24 | 30 | 35 | 41 | 45 | 0.76 | 220 |
| Blank | 0 | 0 | 0 | 0 | 0 | 0 | 0 | 0 | 0 | n. m. | >10000 |

What is claimed is:

1. A method of using a resin for breaking oil-water emulsions, where the resin is obtained from a compound of the formula 1

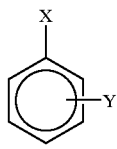

(1)

in which

X is —NHR$^1$, —COOH or —CONHR$^2$, in which

R$^1$ is H, C$_1$–C$_{30}$-alkyl, C$_2$–C$_{30}$-alkenyl, C$_6$–C$_{18}$-aryl, C$_7$–C$_{30}$-alkylaryl or —COR$^2$ R$^2$ is H, C$_1$–C$_{30}$-alkyl, C$_2$–C$_{30}$-alkenyl, C$_6$–C$_{18}$-aryl or C$_7$–C$_{30}$-alkylaryl, Y is in the ortho, mets or pars position relative to X, and is a radical of the formulae 2 to 5

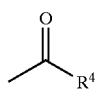

(3)

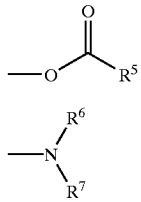

(4)

(5)

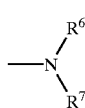

in which

R$^3$ is C$_1$–C$_{30}$-alkyl, C$_2$–C$_{30}$-alkenyl, C$_6$–C$_{18}$-aryl, C$_7$–C$_{30}$-alkyaryl R$^4$ is —OR$^3$, —NR$^6$R$^7$ or —R$^5$ R$^5$ is C$_1$–C$_{30}$-alkyl, C$_2$–C$_{30}$-alkenyl, C$_6$–C$_{18}$-aryl or C$_7$–C$_{30}$-alkylaryl R$^6$ has the same meaning as given for R$^3$, or is —COR$^3$, but is independent of R$^3$, R$^7$ has the same meaning as given for R$^3$, or is —COR$^3$, but is independent of R$^3$, where, by performing the steps A) or B) with formula 1 and the resin is obtained from performing steps A) and B), which can be carried out in any order, of A) reaction with an aldehyde of the formula 6

R$^8$—CHO (6), where R$^8$ is H, C$_1$–C$_{30}$-alkyl, C$_2$–C$_{30}$-alkenyl, C$_6$–C$_{18}$-aryl or C$_7$–C$_{30}$-alkylaryl, and B) alkoxylation with a C$_2$–C$_4$-alkylene oxide in molar excess, such that a resulting alkoxylate has a degree of alkoxylation of from 1 to 100 alkylene oxide units per —OH or —NH group, and the resin has a molecular mass of from 250 to 100,000 units; the method comprising adding the resin to an oil-water emulsion.

2. A resin obtained from a compound of formula 1

(1)

in which

X is —NHR$^1$, in which

R$^1$ is H, C$_1$–C$_{30}$-alkyl, C$_2$–C$_{30}$-alkenyl, C$_6$–C$_{18}$-aryl, C$_7$–C$_{30}$-alkylaryl Y is in the ortho, meta or para position relative to X, and is a radical of formula 2

—O—R$^3$ (2)

in which

R$^3$ is C$_1$–C$_{30}$-alkyl, C$_2$–C$_{30}$-alkylaryl, C$_6$–C$_{18}$-aryl, C$_7$–C$_{30}$-alkylary where, by performing the steps A) or B) with formula 1 end the resin is obtained from performing steps A) and B), which can be carried out in any order, of A) reaction with an aldehyde of the formula 6

R$^8$—CHO (6), where R$^8$ is H, C$_1$–C$_{30}$-alkyl, C$_2$–C$_{30}$-alkenyl, C$_6$–C$_{18}$-aryl or C$_7$–C$_{30}$-alkylaryl, and B) alkoxylation with a $C_2$–$C_4$-alkylene oxide in molar excess, such that a resulting alkoxylate has a degree of alkoxylation of from 1 to 100 alkylene oxide units per —OH or —NH group, and the resin has a molecular mass of from 250 to 100,000 units.

3. The resin as claimed in claim 2, which has been condensed using formaldehyde.

4. The resin as claimed in claim 2, which, on average, has been ethoxylated with from 2 to 50 ethoxy units per free NH group.

* * * * *